Oct. 26, 1965  J. P. FORD  3,214,563

ELECTRICAL DRILLING

Filed March 28, 1963  2 Sheets-Sheet 1

IONS   SPACE CHARGE

INVENTOR.
JOHN P. FORD
BY
*Stuart W. Wohlgemuth*
ATTORNEY

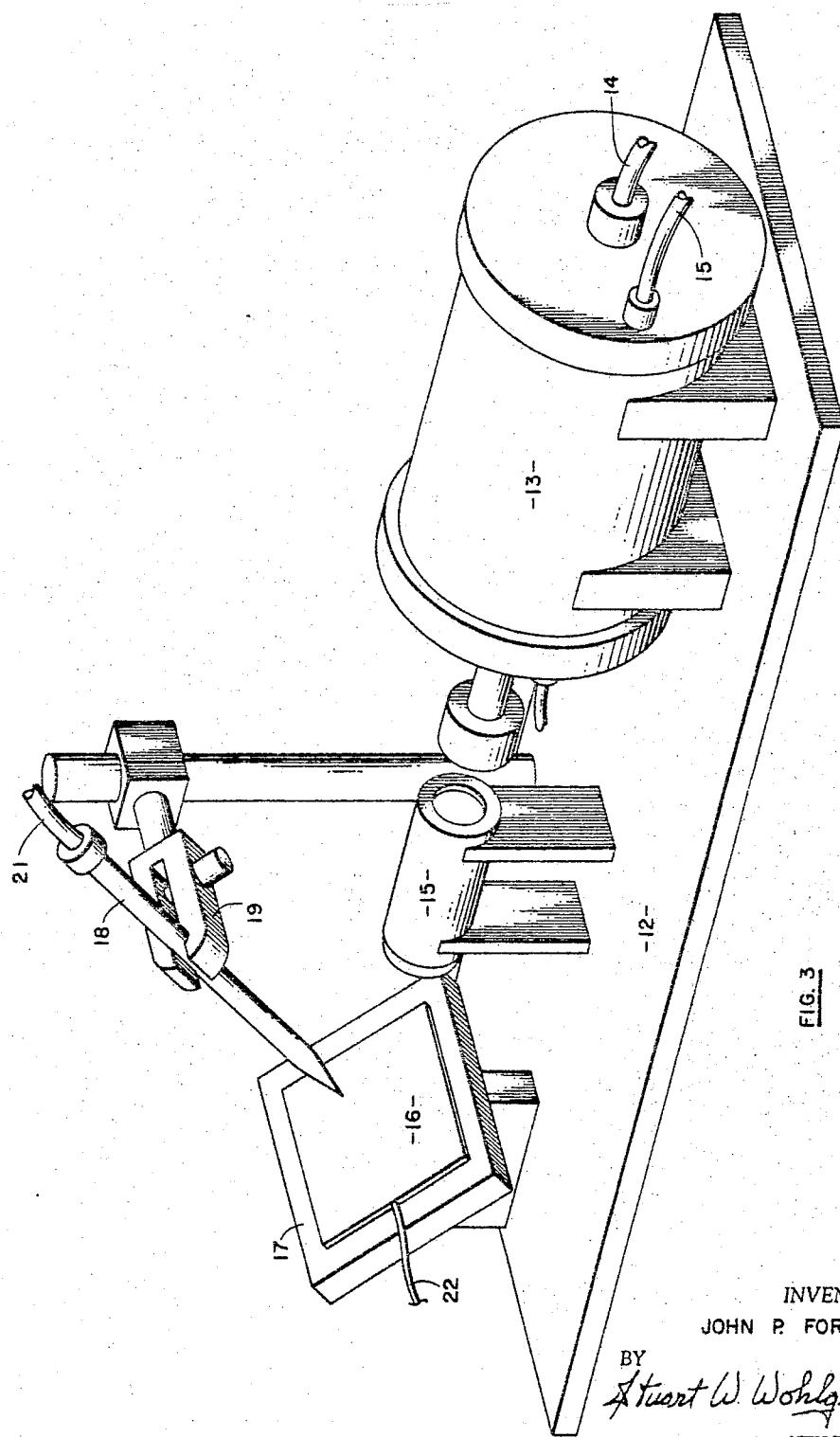

3,214,563
ELECTRICAL DRILLING
John P. Ford, Canoga Park, Calif., assignor to North American Aviation, Inc.
Filed Mar. 28, 1963, Ser. No. 268,642
4 Claims. (Cl. 219—69)

This invention relates to a method and apparatus for electrical machining. More particularly the invention pertains to a method and apparatus for electrical machining wherein the accuracy is controlled through the use of a laser.

The electric arc has been widely used for the drilling and cutting of materials. Simply stated, this is accomplished by the evaporation of the material due to the large work energies of the arc. In drilling with the use of an electric arc, the size of the hole and its depth in the conducting material which is being worked can be controlled by the current flowing in the arc circuit. The advantage in using an electric arc is readily apparent from the fact that the temperature which is above 5000° F. at one atmosphere and the plasma of an electric arc is great enough to evaporate most present-day materials. As a result, the electric arc may accomplish drilling and cutting of materials which cannot be so worked by any other conventional means. The primary difficulty in utilizing electric arc for producing a hole by evaporation is in the controlling of the location and the uniformity of the hole. This results from the arc often being wider than the hole desired to be drilled and additionally the arc cannot be accurately controlled and tends to slightly wander on the surface of the workpiece once the plasma is established on the surface. A further reason for this lack of control is that the arc is not a regular shaped beam, so to speak, but rather is irregular in its form and thus the hole drilled will have such a characteristic of the irregularity.

The optical maser or commonly referred to laser provides a means for producing and amplifying coherent light. The principle of the laser is well known in the art and is extensively discussed in the IRE Proceedings in the article, "Some Potentialities of Optical Masers" by B. M. Oliver, pages 135–141, February 1962. Excellent control of the coherent light output of the laser is practical. Concentration of the power from the laser by focusing may be achieved up to the equivalent of $10^{16}$ watts per cm.$^2$ are obtainable. Because of the short wave length optical techniques for focusing and defraction are generally employed. However, the primary limitation of the laser is the small total power from the continuous output lasers. The solid lasers such as the ruby laser provide greater power and short pulse durations, their work function is still too small for many industrial applications. Thus, the laser has been utilized for the active drilling of small holes in thin metal films. This results from the fact that in today's technology the theoretical power, previously referred to as $10^{16}$ watts per cm.$^2$, cannot be achieved. Generally the output of the available laser of today is up to the order of three joules of work. Thus, in order for the pulsed laser to be used to drill a hole of sufficient depth, an exceedingly high number of individual pulses would be required to accomplish this result and the job would be extremely time consuming.

Thus, an object of this invention is to provide a method and apparatus for accurately controlling the output and location of an electrical arc on the surface of a workpiece.

Another object of this invention is to provide higher work on a workpiece than that realized from the utilization of either an electrical arc or optical laser.

Still another object of this invention is to provide a novel method and apparatus for the machining of materials.

One other object of this invention is to increase the effectiveness of an electrical arc utilized in the working of materials.

It is believed the above and other objects will become apparent from the following detailed description in which:

FIGS. 1a–c, represent the three stages in the formation of an electric arc,

FIG. 3 is a pictorial view of the apparatus used in utilizing the novel method of this invention.

Briefly described, the method of this invention utilizes an optical laser to accurately position a hole in the conductive material by establishing, pulsing and/or continuing a hot plasma at the point where the hole is to be drilled. The arc is established after the plasma is formed by the laser and provides the large work energy required to evaporate a larger or deeper hole.

To better understand the invention, a description of the phenomenon of producing an arc without the presence of a laser beam between two electrodes will be discussed herein with reference particularly to FIG. 1, a–c.

Figure 1A:
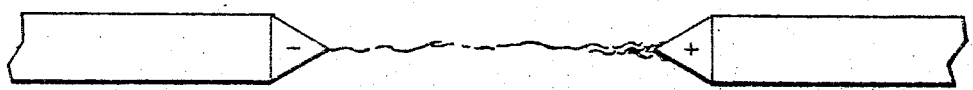
Figure 1B:
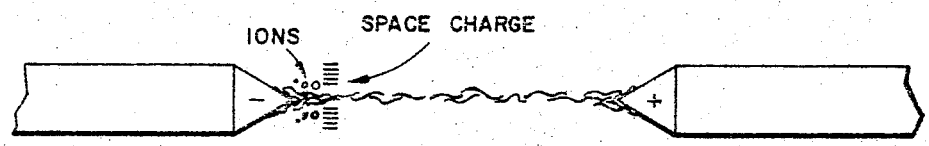

As seen in FIG. 1a, the first stage of the arcing is seen. This is normally called the corona of streaming stage. This is the phenomenon of gas breakdown when the electrical stresses at the surface of the electrodes exceed the values necessary to produce ionization in the surrounding gas. It is the condition preceding sparking that is seen normally, the greater degree of streaming is on the cathode while a smaller amount is found on the anode. As described herein, the cathode will normally be the workpiece while the anode is the electrode directed at the workpiece. This is not necessary but is being used for illustrative purposes. The second stage is seen in FIG. 1b. It is called the sparking stage. At this point there is an unstable and discontinuous occurrence marking the transition from one more or less stable condition occurring between the electrodes in the gas to another one. At the sparking stage a conducting path is formed, completely bridging the gap. Additionally, an efficient source of secondary emission must be provided at the cathode. The conductivity produced must have been sufficient to at least discharge the electrode for the spark to said to have passed. For air, the minimum sparking condition is normally 275 volts. Similar values hold for other gases. It should be pointed out that this requirement of voltage is for a spark to occur without touching the electrodes.

Figure 1C:

The third stage of creating an electrical arc is shown in FIG. 1c. This is the arcing stage. An arcing is a discharge whose cathode mechanism depends largely on thermionic emission. To further describe the arc reference is now made to the region adjacent the anode. In this area thermionic emission is created due largely to collisions of high velocity electrons. Due to the collisions of these electrons there is additionally produced positive ions which though relatively few in number must be present in order to sustain the arc. Additionally, a negative space charge is built up surrounding the anode which charge is due to the secondary emission of electrons from the anode. These electrons from the secondary emission are caused by the bombardment on the surface of the anode of the higher velocity electrons. The cathode is the largest source of the thermionic emission, which is generally much greater than that found in the anode. This thermionic emission is due largely to bombardment of the surface of the cathode by positive ions. This bombardment is mostly from ions of a gas and is generally not created by the positive ions from the anode. In the gas column itself, the ionization is due largely to collision between neutral configurations at elevated temperatures. Electrons in the arc ionize molecules indirectly by raising the temperature of individual atoms of molecules. The temperature in the arc column is dependent on the gas species and is independent of the current flowing in the arc since this process is essentially in equilibrium.

To explain the function of the laser, a discussion of the output thereof should be described. The focused power output of the laser theoretically is $$I(r) = I_o \left[ \frac{2J_1\left(\frac{\pi d_r}{\lambda f}\right)}{\left(\frac{\pi d_r}{\lambda f}\right)} \right]^2$$

where $r$ = radius of objective
$d$ = diameter of the objective
$f$ = focal length of the objective
$\lambda$ = wavelength
$I(r)$ = intensity of radiation
$I_o$ = intensity at workpiece Assuming the coherent light output fills the objective, the focused light pattern is:

$$I_o = \frac{\pi}{4} \frac{P}{\pi^2 \left(\frac{f}{d}\right)^2} \approx \frac{1}{2} \frac{P}{\lambda^2}$$

Thus, the intensity ($I_o$) is:

$$I_o = \frac{A}{\lambda^2 f^2} P$$

where $A$ = area of the objective
$P$ = power in the light beam out of the laser Assuming a value of 10 kw. for the pulsed power output of a ruby laser and a wavelength of 0.7μ which is the wavelength of the ruby laser, the power $I_o = 10^{16}$ watts per cm.² This amount of power is at an energy level that exceeds the ionization level of virtually any known material. Thus, it can be concluded that the temperatures required to establish a local ionized plasma of evaporated material around the focal point of a practical laser system should be easily obtainable.

In the herein invention the focal point of the laser is directed to the point on the workpiece or cathode desired to be drilled. Thus, the gas at this focal point is ionized by the laser output due to the thermionic emission of the workpiece. In effect one might visualize a sheet of material where the electrical conductivity is uniformly low at all points except at the focal point of the laser where it is high. Since electron flow will seek the path of least resistance, an arc should always tend to establish itself between the plasma point and the anode assuming a uniform electrical field existing over the sheet. It is this effect which serves to guide the output of the anode and the arc itself to a given point on the surface of the workpiece, thus carefully controlling and pinpointing the arc.

Figure 2:
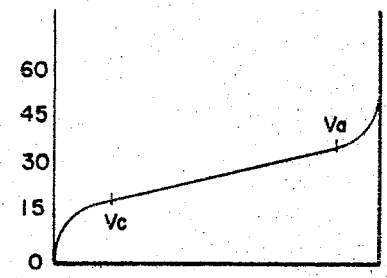
FIG. 2 is a diagrammatic view of an electric arc and plot of voltage drop.

For purposes of illustration of the significance of the invention, attention is directed to FIG. 2. The model chosen for demonstrating the properties of the electric arc is a thermionic cathode emitter similar to a gas field arc tube where the gas would be air at one atmosphere pressure and with local plasma at the focal point of the laser system emitter from the cathode. A typical arc carrying eight amperes with carbon electrodes 1 and 2 spaced about 4 mm. apart is disclosed in FIG. 2. The figure depicts the case of a cold cathode emitter. For a hot cathode emitter the voltage drop across the cathode is much lower, being approximately the ionization potential of the molecules. As seen from the graph in the figure, the total voltage drop across the arc is 60 volts. The cathode fall, $V_c$, is about 15-20 volts as shown. The anode fall, $V_a$, is not of any moment for this discussion and is shown for illustration only. The cathode fall is a voltage drop from a point in the arc adjacent the tip of the cathode to the body of the cathode itself. In the case of the utilization of the laser, the gas at the focal point on the cathode is already ionized by the laser output. Thus, $V_c$ or the voltage drop across the cathode can be expected to be lower than normally encountered in gas discharge tubes, is on the order of 5 to 10 volts. Thus, in general it may be stated that substitution of the normal potential fall in part or wholly by use of an external thermionic source, that is the laser, changes the energy balance of the electric arc. Two major effects result from this: (1) More of the arc electrical power is converted into increased available work energy. In other words, without the laser a significant portion of the electrical power in the arc is diverted to create the necessary thermionic emission on the surface of the cathode as shown in FIG. 1c. Now that this thermionic emission comes from the laser rather than the arc, the electrical power in the arc may be utilized strictly for work purposes and not wasted on establishing thermionic emission. (2) The temperature gradient or heat loss at the work is lessened.

An additional effect obtained through the utilization of a laser in combination with the arc is that the experimental results obtained indicate that the focus laser emission tends to constrict or narrow the arc plasma at the focal point of a laser. As a result, the precise location and size of a hole to be drilled is very accurately determined and controlled. Additionally, because of this constricting effect, temperatures of the arc at the focal point of the laser should be further increased since all the plasma energy is restricted to a more narrow area and not dispersed over the workpiece. This effect and the previous effects enumerated all tend to increase the work potential of the electric arc.

To illustrate the principle of this invention, reference is now had to the apparatus as shown in FIG. 3. A base plate 12 serves to support the various items utilized in performing the invention although the various means may be separately supported. A housing 13 containing the ruby laser utilized is provided having a lead 14 from a capacitor bank (not shown) to supply the power and a second line 15 to trigger the laser. The output of the laser is directed through a focusing lens 15 towards the workpiece 16 mounted on a support plate 17. It is to be noted that the workpiece is supported at an inclined angle to the axis of the laser beam and is perpendicular to the electrode 18 utilized. However, this is not critical and the laser beam and electrode may be in any relative feasible position. It is pointed out that the laser beam controls the direction of the hole drilled with the arc following the plasma generated. In the particular case illustrated, the hole drilled would be inclined at an angle through the piece 16 in a line with the laser beam. The electrode 18 is positioned and controlled by movable clamp 19 so that its angle may be readily changed as needed. Power is supplied to the electrode 18 through the lead 21 while the line 22 maintains the potential on the workpiece 16. The leads 21 and 22 go to a power source not shown and are connected to this source so as to maintain the workpiece as a cathode and electrode 18 as an anode. The clamp member 19 in addition to permitting rotation of the electrode 18 also permits movement of the electrode closer to or farther from the workpiece 16.

The temperature of an electric arc is difficult to establish. For example, gas pressure, molecular species present in the gas, partial velocities, frequency of collisions, must be considered and generally they may only be estimated. 1 cm.³ of nitrogen weighs $1.25 \times 10^{-3}$ grams at 0° C. and 1 atm. The energy level required to ionize the nitrogen atom to its first energy level is 15.65 ev. or $2.4 \times 10^{-18}$ joules. Considering the energy required to ionize all nitrogen atoms in a gas column 1 cm.³ at 1 atm. to their first energy level requires 1296 joules, it is reasonable to assume that the plasma temperature is well above 5000° F. The boiling point of iron is 4272° F. at this temperature, thermionic emission at 1 atm. and the melting points of other higher temperature elements such as ruthenium and osmium are less; therefore the temperature of plasmas from an electric arc should be sufficient to melt over vaporized all materials encountered in manufacturing processes.

The breakdown voltage of air is approximately 20 to 23 volts per mil at 1 atm.; therefore if one assumes a 0.5 inch separation between the sheet to be drilled (cathode) and the anode (electrode) the breakdown potential should be 11.5 kv.

The ruby laser utilized delivered approximately one joule of light energy concentrated in an area about .020 inch diameter at a wavelength of .7 micron. This is sufficient energy to vaporize material at its surface and produce thermionic emission. A first series of tests were conducted with a minimum sparking potential of 7 kv. which was required to break down an electrical gap 8 mm. wide and the laser was used to trigger the arc. When the gap was reduced to 4 mm. the potential was reduced to 6 volts. Again the laser successfully triggered the arc. From the experiments conducted, it was found that the sparking potential versus the gap width was not linear. Thus, it is concluded that the arc is triggered by the plasma generated by the laser. For example, 15 kv. were required without the laser to break down an air gap 8 mm. in width; whereas it took only 7 kv. with the laser as previously mentioned. Additional tests disclose that no arc triggered occurs when the electrode is placed at a position so as not to intercept the plasma at the reduced electrode potentials.

In the experiments conducted the target was at a negative potential with respect to the electrode. The electrode was made of drill rod steel sharpened to a point. The ablation of the electrode point was evidenced. The target in the above cases was mild steel. It was drilled whenever the arc-laser was used.

It was also demonstrated that a laser could deflect an arc up to 45° from its normal path. It was further shown that in using a laser beam that the discharge envelope of an arc can be localized to a diameter of about .020 inch; whereas the discharge envelope without laser assistance is about .250 inch in diameter. This restricted arc under the test conditions used had a power density of about 7000 kw./in.² comparing favorably with successful electron beam welding.

The machining potential was demonstrated by drilling a hole about .015 inch in a diameter and .068 inch deep in an aluminum alloy sheet. This hole was drilled in six milliseconds "burst" which amounted to about .011 inch of metal removed with each firing. Laser burst alone had negligible affect. With the arc alone there was also a negligible affect. For these experiments the electrode was separated approximately 1 mm. from the workpiece.

Generally, the optimum power output obtained from the laser was at a pulse time of nominally 1 millisecond. There is not a continuous power output over this time period but rather the 1 millisecond represents the total time of output from the laser during the pulse. In carrying out the process of this invention it should be apparent that a delay between the initiation of the pulse from the laser and the triggering of the arc is necessitated in order for the plasma to be generated by the laser and affect the arc. Normally the delay is of a very short period of time and was not capable of measurement with the apparatus used for the experiments. This delay would normally be on the order of from between .5 and 1 microsecond. The arc is pulsed through a capacitor bank (not shown) connected to the electrode. This bank is constructed such that its discharge time is less than the laser pulse length. However, it should be established that the delay can vary considerably depending upon the material worked upon, the power source and other factors. The controlling criteria for such delay probably resides in the duration of the plasma generated on the workpiece through the utilization of the laser. In other words the arc must be created and extinguished during the existence of the plasma generated by the laser. Thus, the delay between the triggering of the arc from that of the ignition of the laser should be within the period of time which plasma exists on the workpiece.

The invention is described relative to a pulse laser since only such is currently available. As technology advances and a continuous output laser of sufficient power becomes available, the invention contemplates utilization of a continuous arc in combination with the laser.

The laser device utilized in this invention is conventional in the art. Its construction and components have been discussed at length in the literature. The particular laser device utilized in this description had a ruby crystal measuring one-fourth inch in diameter by three-and-one-fourth inches in length. A flash lamp was supplied which was designed for use up to 800 joules. The cavity is a silvered and polished cylinder. The output wavelength is 6943 angstroms. The laser fires on voltages from 500 to 2000 volts producing output energy levels of one joule uncooled and three joules when cooled with liquid nitrogen.

A particular advantage of the described method is that it is independent of gas pressure. By the adjustment of electrical parameters, the process may be made to work at increased or decreased gas pressure relatively easily and without any practical limits.

Additional application of the process described is that it may be utilized as a remote control device. In this application it may be used as an ignitor for very high voltage arc gaps by placing the low-voltage, high-current electrode in the normal gap area and remotely triggering this arc to produce quantities of ionized gas to break down the larger gap. Thus, it can be seen that the process may be used as a control method for any application that requires timed generation of electrical-ionized molecules. Additionally, the method may be utilized to remotely control work such as in vacuum tube manufacturing. By placing two metal pieces in close proximity to each other in a glass envelope and applying an external electrical potential, the location and control of the weld would be accomplished by pulsing an external laser whose light beams penetrate the glass envelope and focus on the point to be welded.

Additionally, it should be established that the invention described has wider applicability than drilling holes. For example, with a continuous laser or one that may be pulsed with great rapidity the invention would have use in the field of cutting of materials and of welding. When welding, the electrode may be consumable or, alternatively, the weld material may come from an outside source.

Although the invention has been described and illustrated in detail, it is to be clearly understood that the same is by way of illustration and example only and is not to be taken by way of limitation, the spirit and scope of this invention being limited only by the terms of the appended claims.

I claim:
1. A method of working a material comprising:
providing a laser beam producing means,
focusing the laser output to a desired point on said material thereby generating plasma at said point,
providing an electrode in close proximity to said material, maintaining an electrical potential between said electrode and said material causing an electrical arc to be created between said electrode and said point, whereby said laser output continuously controls said arc throughout the work performed.
2. A method of working a material comprising:
providing a laser beam producing element,
focusing the laser output to a desired point on said material thereby generating plasma at said point, providing an electrode in close proximity to said material, maintaining an electrical potential between said electrode and said material causing an electrical arc to be created between said electrode and said point subsequent to the creation of said plasma, whereby said laser output continuously controls said arc throughout the work performed.

3. The method of claim 2 wherein the delay interval between the creation of said plasma and the causing of said electrical arc does not exceed 1 microsecond.

4. A method for accurately controlling the position of an electrical arc comprising:

creating a laser beam and, continuously focusing said laser to a point on a material where it is desired to strike said electrical arc to maintain and stabilize said arc.

References Cited by the Examiner

FOREIGN PATENTS 850,428  10/60  Great Britain.

RICHARD M. WOOD, *Primary Examiner.*